United States Patent [19]

Bealkowski et al.

[11] Patent Number: 5,465,357
[45] Date of Patent: Nov. 7, 1995

[54] METHOD AND APPARATUS FOR AN AUTOMATED DYNAMIC LOAD OF AN ABIOS DEVICE SUPPORT LAYER IN A COMPUTER SYSTEM

[75] Inventors: Richard Bealkowski, Delray Beach; Douglas R. Geisler; Michael R. Turner, both of Boca Raton, all of Fla.

[73] Assignee: International Business Machines Corporation, Armonk, N.Y.

[21] Appl. No.: 902,315

[22] Filed: Jun. 22, 1992

[51] Int. Cl.⁶ .................................................. G06F 9/24
[52] U.S. Cl. ........................... 395/700; 364/DIG. 1; 364/231; 364/280.9
[58] Field of Search ............................................... 395/700

[56] References Cited

U.S. PATENT DOCUMENTS

| | | | |
|---|---|---|---|
| 5,136,713 | 8/1992 | Bealkowski et al. | 395/700 |
| 5,175,831 | 12/1992 | Kumar | 395/425 |
| 5,187,792 | 2/1993 | Dayan et al. | 395/725 |
| 5,210,875 | 5/1993 | Bealkowski et al. | 395/700 |
| 5,220,667 | 6/1993 | Ichieda | 395/700 |
| 5,230,052 | 7/1993 | Dayan et al. | 395/700 |
| 5,230,058 | 7/1993 | Kumar | 395/800 |
| 5,247,659 | 9/1993 | Curran et al. | 395/575 |
| 5,257,378 | 10/1993 | Sideserf et al. | 395/700 |
| 5,269,022 | 12/1993 | Shinjo et al. | 395/700 |

*Primary Examiner*—Thomas M. Heckler
*Attorney, Agent, or Firm*—Robert S. Babayi

[57] ABSTRACT

A personal computer system is disclosed which is compatible with application programs and operating system software. The personal computer system includes a microprocessor electrically coupled to a data bus, non-volatile memory electrically coupled to the data bus, volatile memory electrically responsive to the data bus, and a direct access storage device electrically responsive to the data bus. The non-volatile memory stores a first portion of operating system microcode and stores a load indicator. The direct access storage device stores the second portion of operating system microcode which is loaded into the volatile memory by the inialization program based upon the load indicator.

8 Claims, 16 Drawing Sheets

"LOCAL AREA NETWORK"

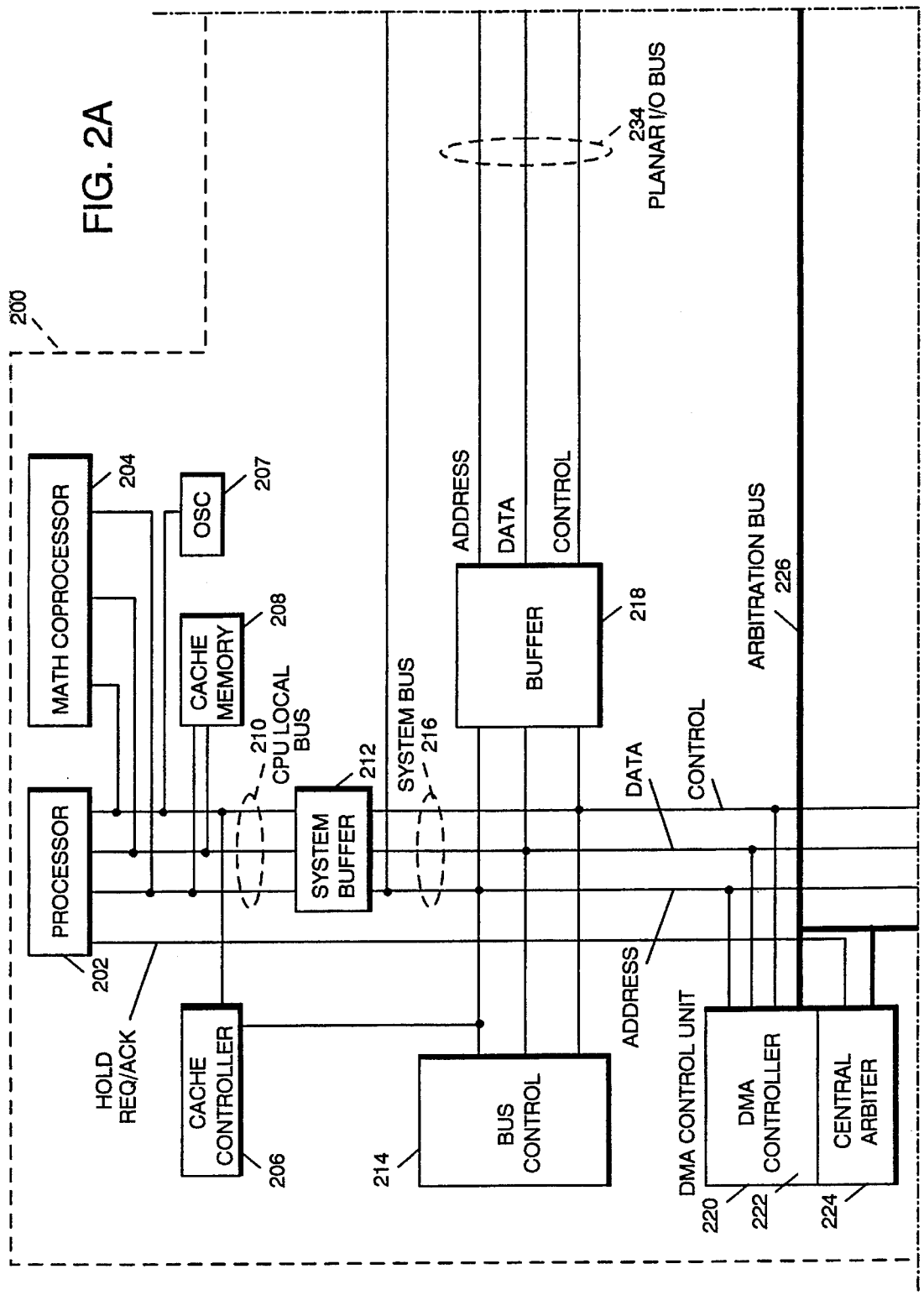

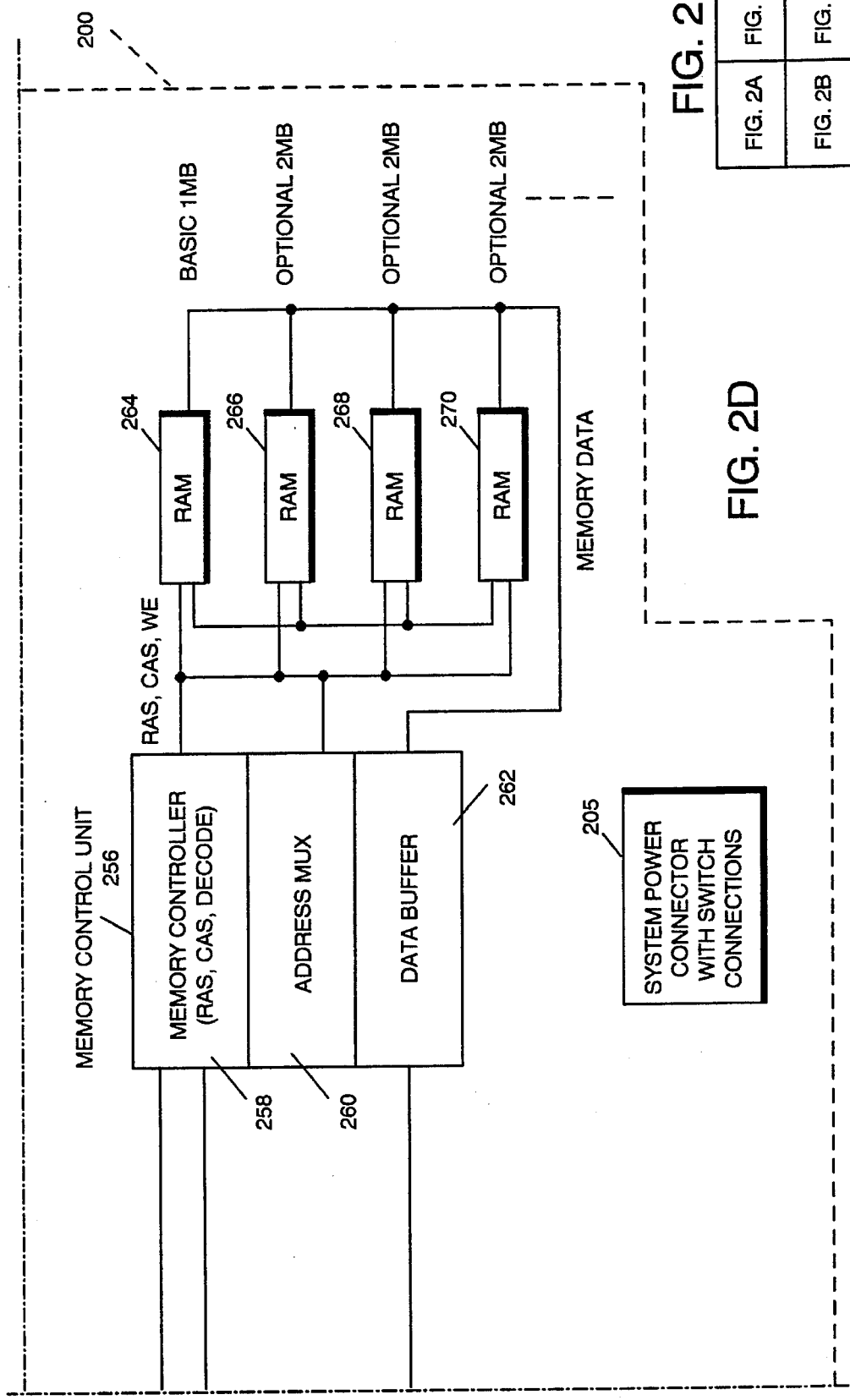

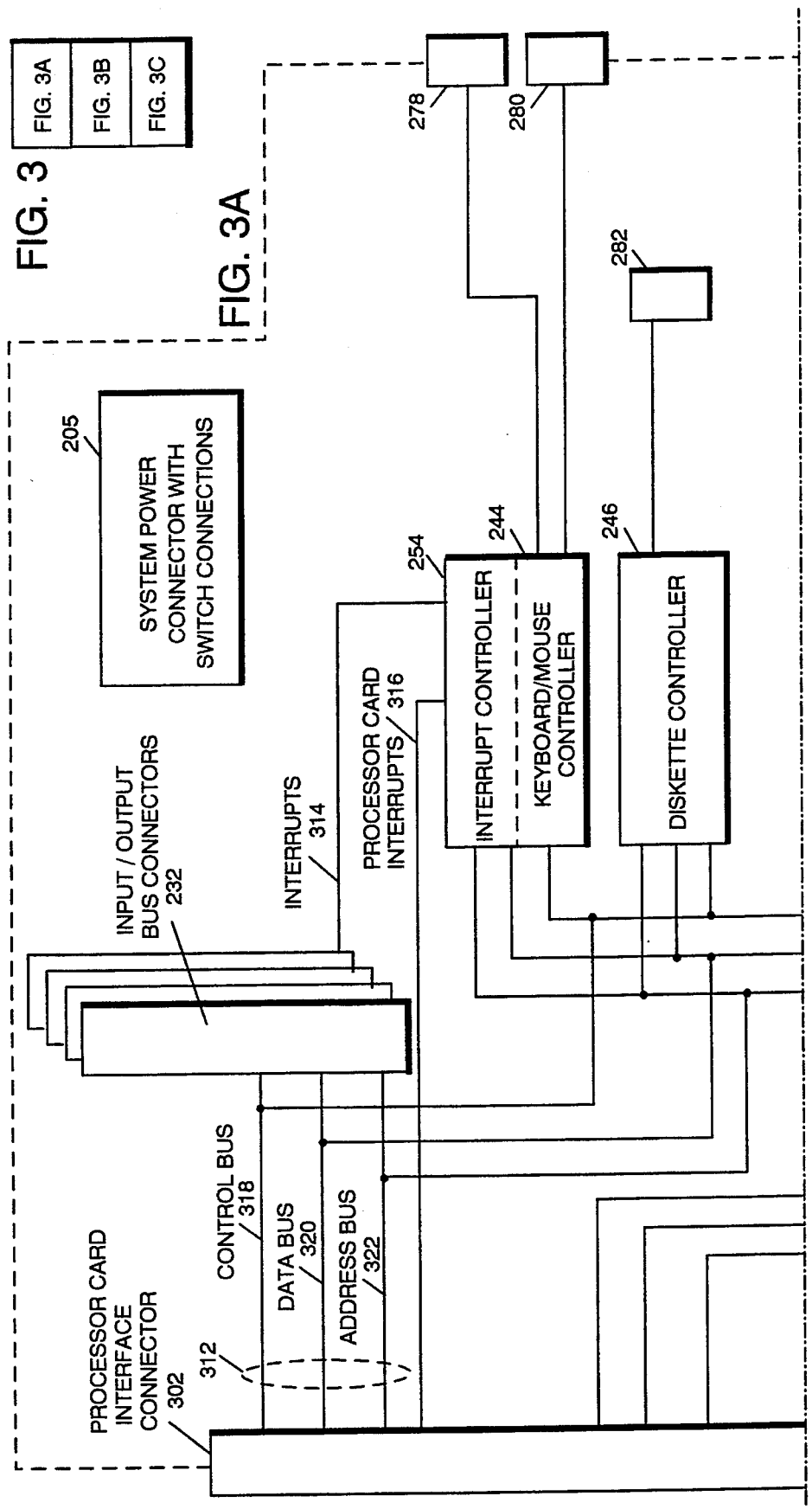

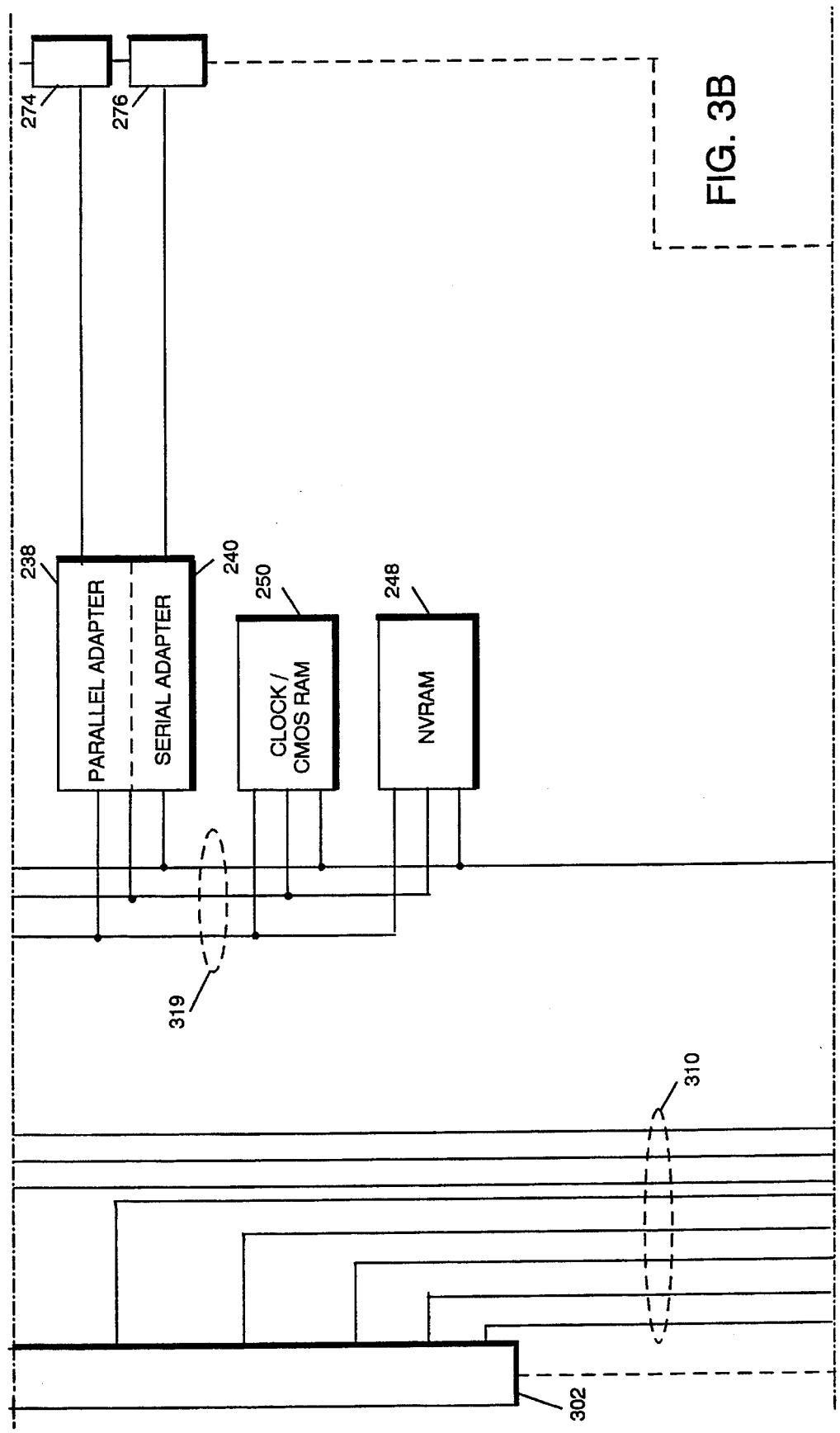

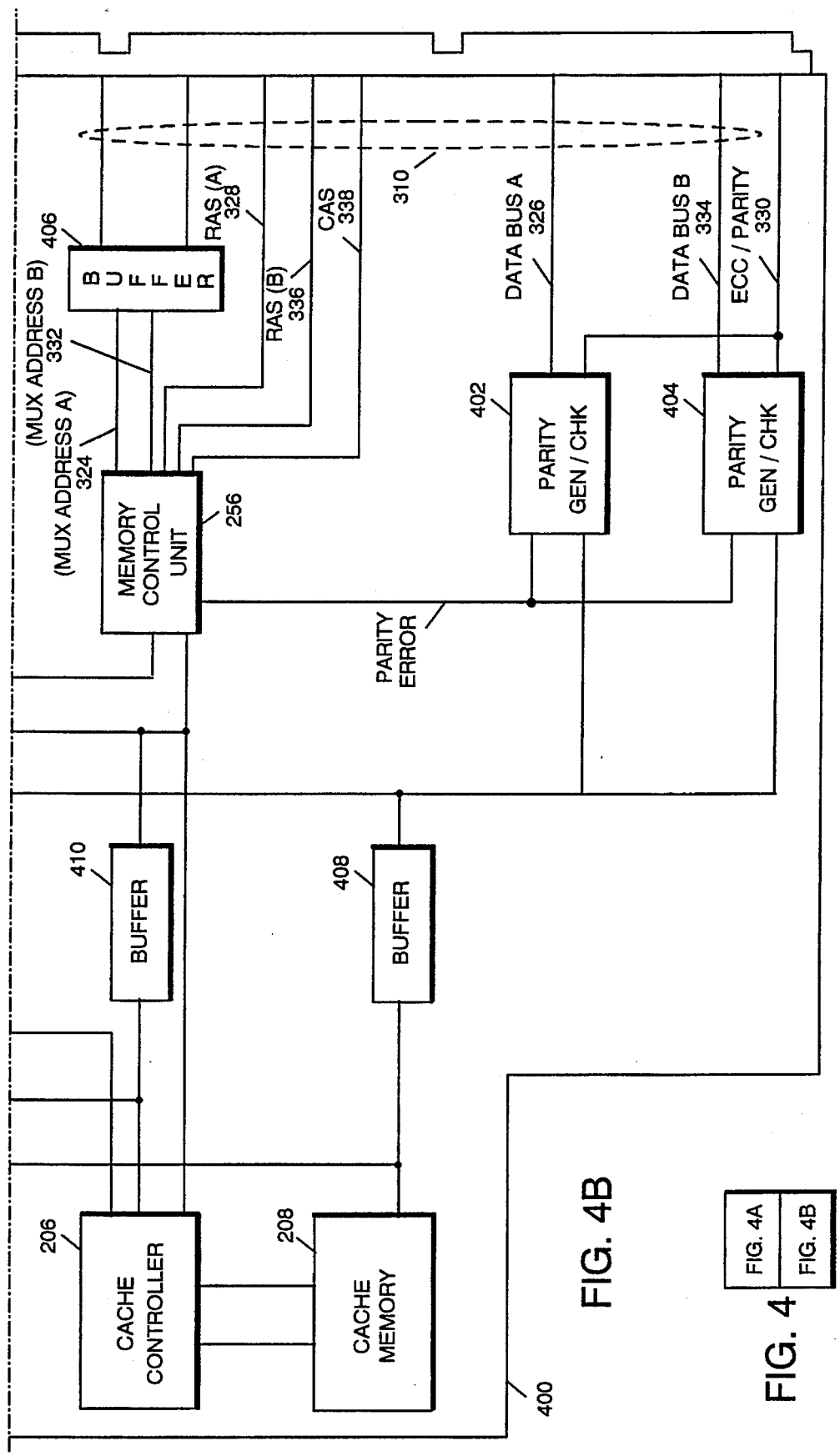

FIG. 9

| Field | Offset | Length |
|---|---|---|
| Signature = AA55H (Word Value) | +00H | 2 |
| Length in 512-Byte Blocks | +02H | 1 |
| Model Byte | +03H | 1 |
| Submodel Byte | +04H | 1 |
| ROM Revision Level | +05H | 1 |
| Device ID | +06H | 2 |
| Number of Initialization Table Entries | +08H | 1 |
| Build Initialization Table Entry Point | +09H | 3 |
| Secondary Device ID | +0CH | 1 |
| Revision | +0DH | 1 |
| Extension Header Length in Bytes | +0EH | 2 |
| Reserved | +10H | 2 |
| Reserved | +12H | 2 |
| Initialization Routine Offset | +14H | 2 |

FIG. 10A
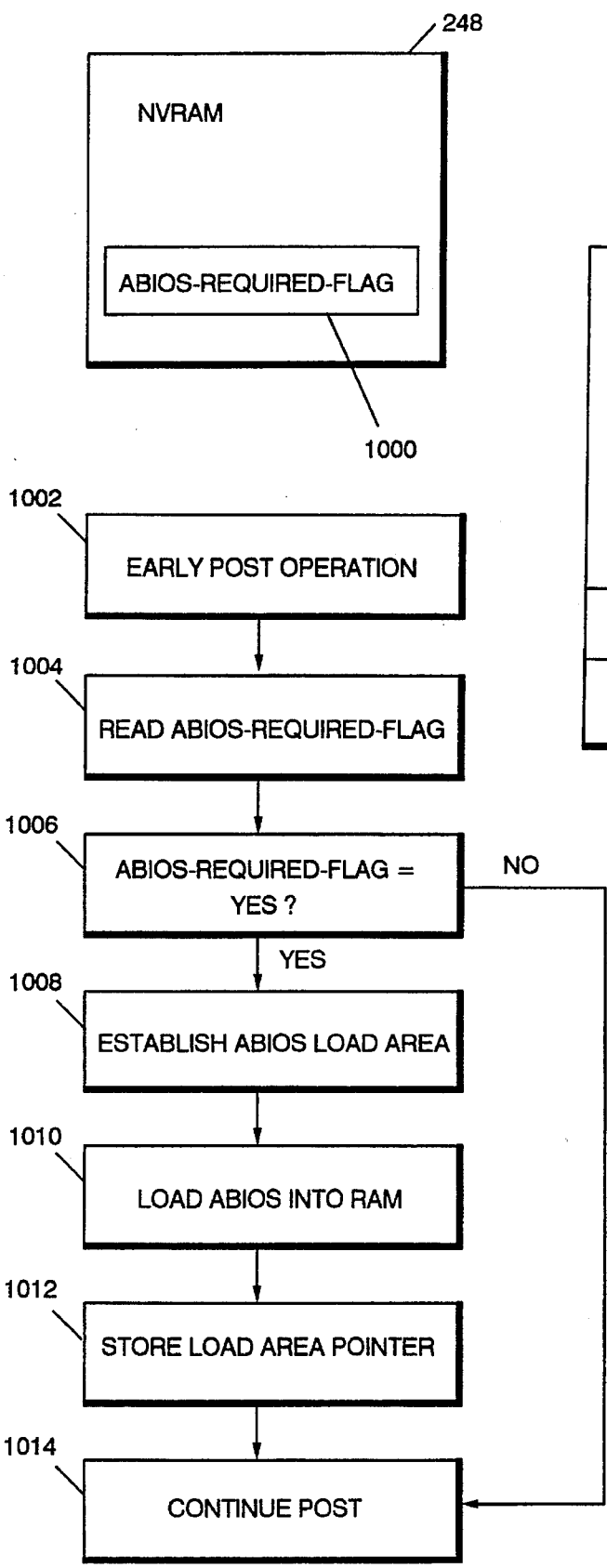
FIG. 10C
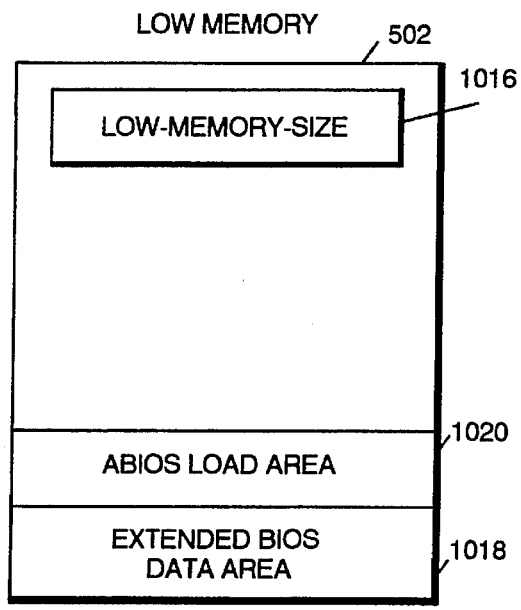
FIG. 10B

METHOD AND APPARATUS FOR AN AUTOMATED DYNAMIC LOAD OF AN ABIOS DEVICE SUPPORT LAYER IN A COMPUTER SYSTEM

Related Applications

The following patent applications, which are filed on even date herewith, are incorporated by reference:

Patent application Ser. No. 07/902,311 Filed Entitled Jun. 22, 1992, "A METHOD AND APPARATUS FOR DYNAMIC LOAD OF AN ABIOS DEVICE SUPPORT LAYER IN A COMPUTER SYSTEM" (Further identified as Attorney Docket BC9-92-018).

Patent application Ser. No. 07/902,330, Filed Jun. 22, 1992, Entitled "A METHOD AND APPARATUS FOR PROVIDING A MODULAR ABIOS DEVICE SUPPORT LAYER IN A COMPUTER SYSTEM" (Further identified as Attorney Docket BC9-92-019).

Patent application Ser. No. 07/902,134 Filed Entitled "A METHOD AND APPARATUS FOR CONFIGURING AND INSTALLING A LOADABLE ABIOS DEVICE SUPPORT LAYER IN A COMPUTER SYSTEM" (Further identified as Attorney Docket BC9-92-071).

FIELD OF THE INVENTION

This invention relates to personal computer systems and, more particularly, to a method and apparatus for loading and initializing firmware.

BACKGROUND OF THE INVENTION

Personal computer systems in general, and IBM personal computers in particular, have attained widespread use for providing computer power to many segments of today's society. A personal computer system can usually be defined as a desk top, floor standing, or portable computer that includes a system unit having a system processor, a display monitor, a keyboard, one or more diskette drives, a fixed disk storage, an optional pointing device such as a "mouse," and an optional printer. These systems are designed primarily to give independent computing power to a single user or small group of users and are inexpensively priced for purchase by individuals or businesses. Examples of such personal computer systems are sold under the trademarks: IBM's PERSONAL COMPUTER, PERSONAL COMPUTER XT, PERSONAL COMPUTER AT and IBM's PERSONAL SYSTEM/2 Models 25, 30, 50, 55, 56, 57, 60, 65, 70, 80, 90 and 95 (hereinafter referred to as the IBM PC, XT, AT, and PS/2, respectively).

These systems can be classified into two general families. The first family, usually referred to as Family 1 Models, uses a bus architecture exemplified by the AT computer and other "IBM compatible" machines. The second family, referred to as Family 2 Models, uses IBM's MICRO CHANNEL bus architecture exemplified by IBM's PS/2 Models 50 through 95. The bus architectures used in Family 1 and Family 2 models are well known in the art.

Beginning with the earliest personal computer system of the Family 1 models, the IBM PC, and through the current Family 2 models, the system processor of the personal computer is from the Intel 86 Family of microprocessors. The Intel 86 Family of processors includes the 8088, 8086, 80286, 80386, and 80486 processors commercially available from Intel Corporation. The architecture of the Intel 86 Family of processors provides an upwardly compatible instruction set which assists in preserving software investments from previous processors in the 86 Family of processors. This upward compatibility preserves the software application base of the personal computers which use this family of processors. A variety of commonly available and well known software operating systems, such as a DOS or an OS/2 operating system, operate on various members of the Intel 86 Family of processors.

The PC and XT computers use the Intel 8088 processor. The AT computers use the Intel 80286 processor. The PS/2 line spans several of the Intel processors. More specifically, a PS/2 Model 30, which is similar to the IBM PC and XT, uses an Intel 8086 processor. The PS/2 Models 50 and 60 both use the Intel 80286 processors. The Intel 80386 processor is used in the IBM PS/2 Model 80 and certain versions of the IBM PS/2 Model 70. Other versions of the IBM PS/2 Model 70, as well as the PS/2 Models 90 XP 486 and 95 XP 486, use the Intel 80486 processor.

The processors in the Intel 86 Family support a variety of operating modes. Real mode, which supports a one megabyte system address space, is the only operating mode of the 8088 and 8086 processors. The 80286 supports both a real and a protected operating mode. Protected mode provides a mode of operation which prevents an application from interfering with the operation of other applications or the operating system. The 80286 provides extended addressing capabilities, allowing up to sixteen megabytes of memory to be addressed directly. To maintain downward compatibility, the 80286 can be operated in real mode to emulate the real mode of the 8088 or 8086. The 80386 and 80486 can address up to four gigabytes of physical memory. The 80386 and 80486 also support a virtual 86 mode of operation. The virtual 86 mode supports the operational characteristics of the real mode within the overall confines of the protected mode environment.

With personal computers, software and hardware compatibility is of great importance. To provide software and hardware compatibility, an insulation layer of system resident code, also referred to as microcode, was established between the hardware and the software. This code provided an operational interface between a user's application program or operating system and the hardware device to relieve the user of the concern about the characteristics of hardware devices. Eventually, the code developed into a basic input/output system (BIOS), for allowing new hardware devices to be added to the system, while insulating the application program/operating system from the peculiarities of the hardware devices. The importance of BIOS was immediately evident because it freed a device driver from depending on specific hardware device characteristics while providing the device driver with an intermediate interface to the hardware device. Because BIOS was an integral part of the computer system and controlled the movement of data in and out of the system processor, it was resident on a system planar board of the system unit and was shipped to the user in either a read-only memory (ROM) or an erasable programmable read-only memory (EPROM). BIOS in the original IBM PC occupied 8K bytes (a kilobyte or "K byte" refers to a quantity of 1024 bytes) of ROM resident on the planar board. The ROM also contained a power-on self test (POST) program which was used to test and initialize the computer system. The accumulation of code resident in the computer system ROM became known as the "system firmware," or simply firmware." Thus, the firmware included a POST portion and a BIOS portion. Sometimes, BIOS was defined to include the POST program.

As new models of the personal computer family were introduced, the firmware was updated and expanded to support new hardware devices such as new input/output (I/O) devices. As could be expected, the firmware started to increase in memory size. For example, with the introduction of the IBM AT, the firmware required 32K bytes of ROM. With the introduction of the PS/2 line, a significantly new BIOS, known as Advanced BIOS, or ABIOS, was developed. However, to maintain software compatibility, BIOS from the Family 1 models had to be included in the Family 2 models. The Family 1 BIOS became known as Compatibility BIOS or CBIOS. Thus, BIOS evolved to include more than one type of BIOS. Present architectural definitions for personal computer systems allow for up to 128K bytes of system firmware address space.

Personal computer systems may be linked to form a network of computers (e.g., a Local Area Network (LAN)) so that users can exchange information, share I/O devices, and utilize a particular direct access storage device (DASD) such as a particular hardfile or diskette. Typically, the LAN includes a client and a server. A server is a computer system which includes a DASD for supplying the storage for one or more clients of the local area network. A client or server may require modifications, updates, extensions or maintenances of the system firmware.

Arrangements for storing, loading and initializing firmware are known. See, for example, commonly owned: patent Application Ser. No. 07/521,050 entitled "Method and Apparatus for Selectively Reclaiming a Portion of RAM in a Personal Computer System," patent Application Ser. No. 07/398,865, entitled "Initial BIOS Load for a Personal Computer System," patent application Ser. No. 07/777,844, entitled "Programmable Firmware Store for a Personal Computer System," patent application Ser. No. 07/799,486, entitled "Automated Programmable Firmware Store for a Personal Computer System," and patent application Ser. No. 07/590,749, entitled "Apparatus and Method for Loading BIOS into a Computer System from a Remote Storage Location," which are all incorporated herein by reference.

SUMMARY OF THE INVENTION

It has been discovered that by linking a first portion of microcode, e.g., a CBIOS portion, to a second portion of microcode, e.g., an ABIOS portion, it is possible to remove the ABIOS portion of microcode from the address space which is reserved for microcode.

A principal object of the present invention is removing the ABIOS program from the "ROM" address spaces of a personal computer system.

Another object of the present invention is to provide more "free" space in the system and feature ROM address space.

Yet another object of the present invention is loading an ABIOS device support software layer in an automated mode.

Yet a further object of the present invention is to continue to provide ABIOS support in a compatible fashion on both disk-based and medialess computer systems.

BRIEF DESCRIPTION OF THE DRAWING

Further and still other objects of the present invention will become more readily apparent in light of the following description when taken in conjunction with the accompanying drawing, in which:

FIG. 9 is an ABIOS program module header;

FIG. 10A is a diagram of NVRAM showing a data area used in the present invention;

FIG. 10B is a flow diagram of an ABIOS load procedure of the present invention and FIG. 10C is a diagram of the low memory address space.

DETAILED DESCRIPTION OF A PREFERRED EMBODIMENT

Figure 1A:
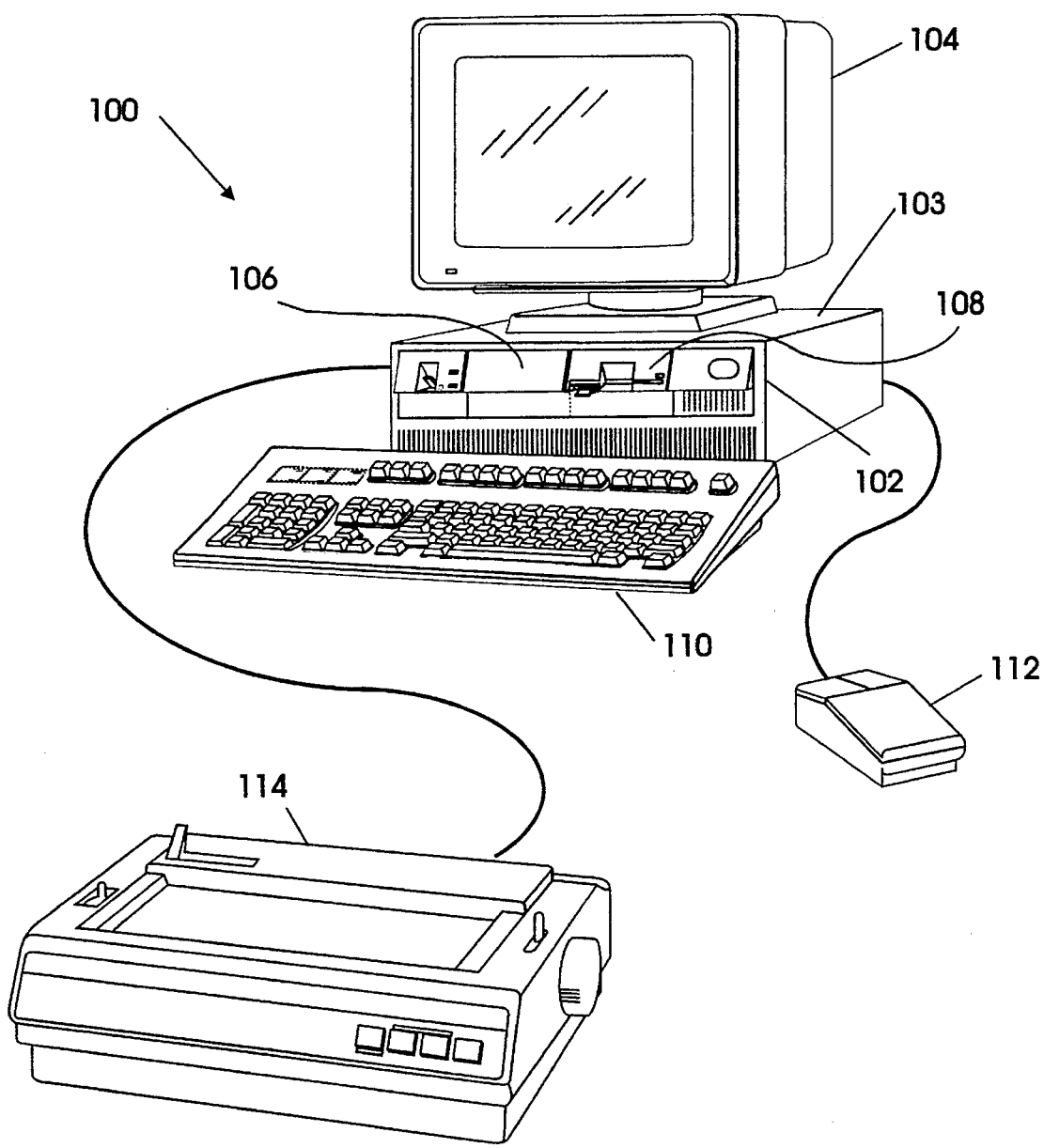
FIG. 1A is a perspective view of a typical personal computer system.

Referring to FIG. 1A, there is shown a personal computer system 100 which employs the present invention. The personal computer system 100 includes a system unit 102 having a suitable enclosure or casing 103, output device or monitor 104 (such as a conventional video display), input devices such as a keyboard 110, an optional mouse 112, and an optional output device such as a printer 114. Finally, the system unit 102 may include one or more mass storage devices such as a diskette drive 108 (operable with a diskette—not shown) and a hard disk drive (hardfile) 106.

Figure 1B:
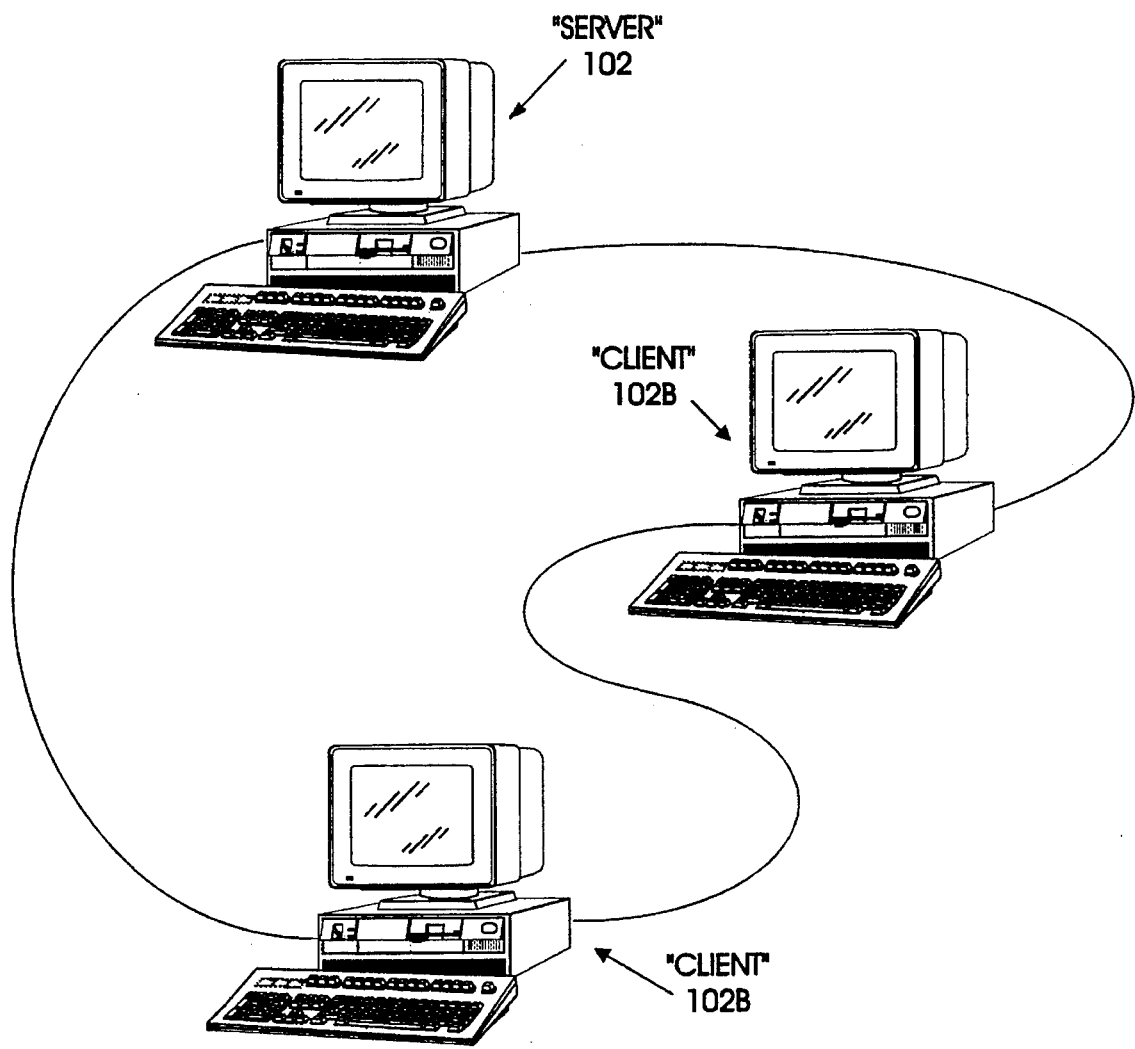
FIG. 1B is a diagram of a typical local area network.

Referring to FIG. 1B, the system unit 102 may be connected electronically in a well-known manner with other system units 102B to form a local area network (LAN). In the LAN, system unit 102 functions as the server and system units 102B function as the clients. System units 102B are identical to the unit 102, except that units 102B include no drives 106, 108 and are thus referred to as medialess clients. Other conventional I/O devices may be connected to the system units 102, 102B for interaction therewith.

Figure 2B:
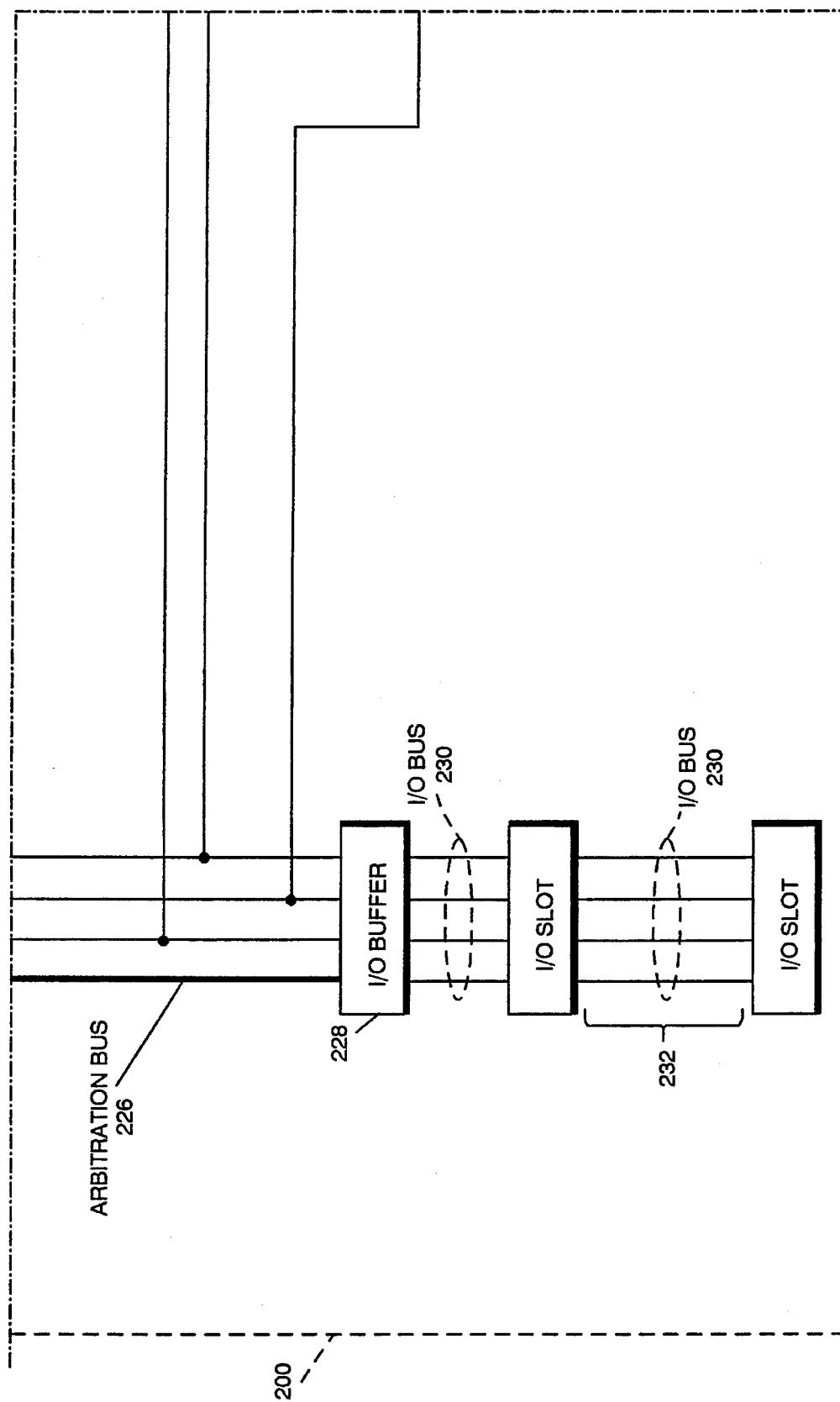
FIG. 2 is a block schematic diagram of a unified planar board for the computer system of FIG. 1A.
Figure 2C:
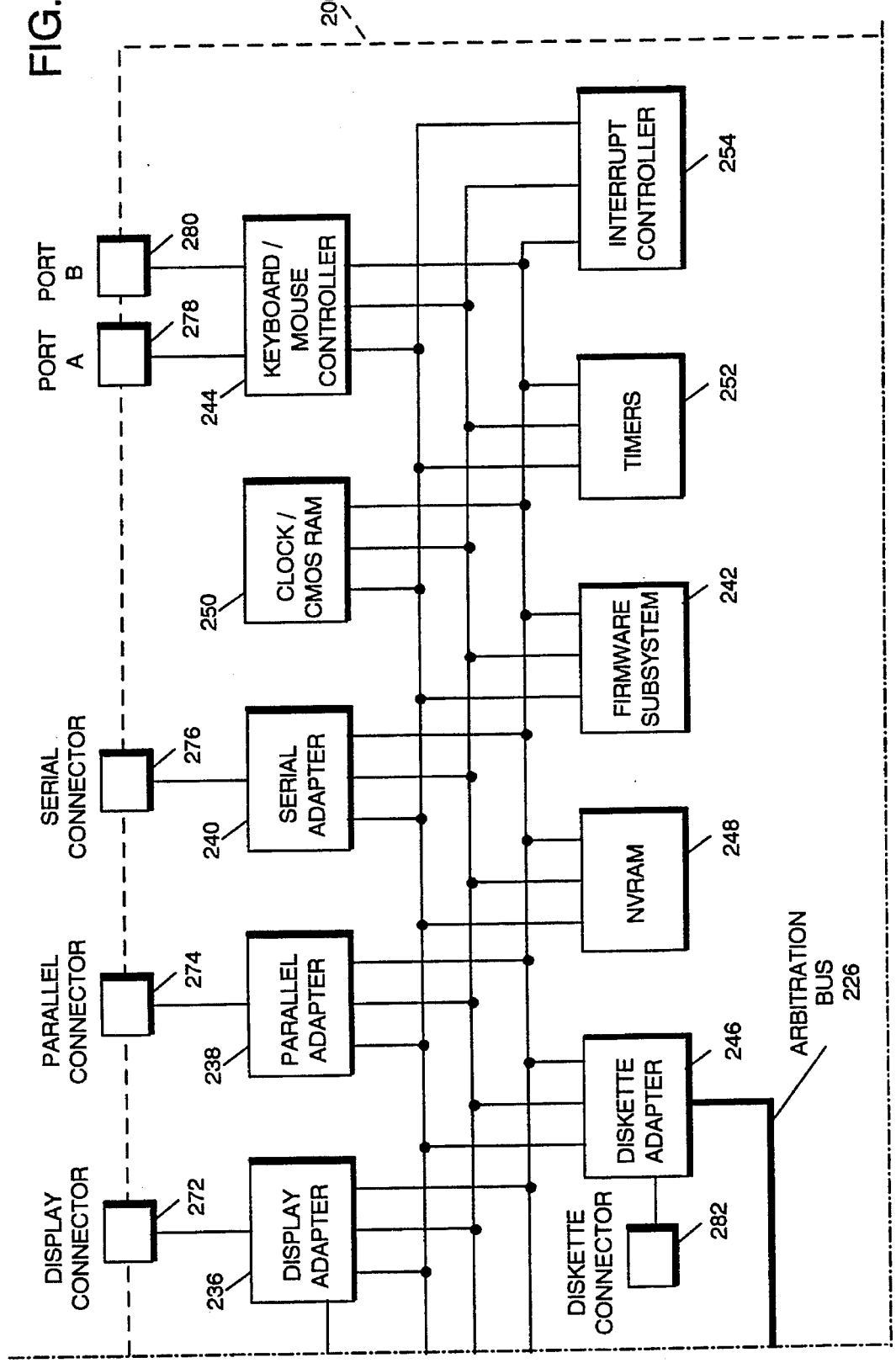

Referring to FIG. 2, there is shown a block diagram of a unified planar 200 of the system unit 102. The planar 200 includes a printed circuit board (PCB) 201 upon which are mounted or connected a number of input/output bus connectors 232 having I/O slots, a processor 202 which is connected by a high speed CPU local bus 210 under control of a bus control unit 214 to a memory control unit 256. The unit 256 is further connected to a main memory such as volatile random access memory (RAM) 264. Any appropriate processor 202 can be used such as an Intel 80386, Intel 80486 or the like. A system power connector 205 is mounted on the PCB 201 for connection to a power unit (not shown) that supplies the necessary power for the system 100.

The CPU local bus 210 (comprising address, data and control components) provides for the interconnection of the processor 202, an optional math coprocessor 204, an optional cache controller 206, and an optional cache memory 208. Also coupled onto the CPU local bus 210 is a system buffer 212. The system buffer 212 is itself connected to a system bus 216 which comprises address, data and control components. The system bus 216 extends between the system buffer 212 and an I/O buffer 228. The system bus 216 is further connected to the bus control unit 214 and to a direct memory access (DMA) control unit 220. The DMA control unit 220 includes a central arbiter 224 and a DMA controller 222. The I/O buffer 228 provides an interface between the system bus 216 and an I/O bus 230. An oscillator 207 is connected as shown for providing suitable clock signals to the computer system 100. Those skilled in the art will recognize that while the preferred embodiment is implemented on the MICRO CHANNEL bus of an IBM PS/2 computer system, which is well known in the art, alternative bus architectures could also be used to employ the invention.

Connected to the I/O bus 230 is a plurality of I/O bus connectors having slots 232 for receiving adapter cards (not shown) which may be further connected to I/O devices or memory (e.g., hardfile 106). Two I/O connectors 232 are shown for convenience, but additional I/O connectors may easily be added to suit the needs of a particular system. An arbitration bus 226 couples the DMA controller 222 and the central arbiter 224 to the I/O connectors 232 and a diskette adapter 246. Also connected to the system bus 216 is the memory control unit 256 which includes a memory controller 258, an address multiplexer 260, and a data buffer 262. The memory control unit 256 is further connected to the main memory such as the random access memory as represented by the RAM module 264. The memory control unit 256 includes logic for mapping addresses to and from the processor 202 to and from particular areas of the RAM 264. While the system 100 is shown with a basic one megabyte RAM module 264, it is understood that additional memory can be interconnected as represented in FIG. 2 by optional memory modules 266, 268, 270.

A buffer 218 is coupled between the system bus 216 and a planar I/O bus 234. The planar I/O bus 234 includes address, data, and control components. Coupled along the planar I/O bus 234 are a variety of I/O adapters and other peripheral components such as a display adapter 236 (which is used to drive the optional display 104), a clock/CMOS RAM 250, a nonvolatile RAM 248 (hereinafter referred to as NVRAM), a serial adapter 240 (other common terms used for "serial" are "asynchronous" and "RS232"), a parallel adapter 238, a plurality of timers 252, the diskette adapter 246, a keyboard/mouse controller 244, an interrupt controller 254, and a firmware subsystem 242. The firmware subsystem typically includes a nonvolatile program store (e.g., ROM) which contains the POST and BIOS programs.

The clock/CMOS RAM 250 is used for time of day calculations. The NVRAM 248 is used to store system configuration data. That is, the NVRAM 248 will contain values which describe the present configuration of the system 100. The NVRAM 248 contains information which describes, for example, adapter card initialization data, capacity of a fixed disk or a diskette, the amount of main memory, etc. Furthermore, these data are stored in NVRAM 248 whenever a configuration program is executed. This configuration program can be a conventional Set Configuration program provided on a system Reference Diskette included with IBM PS/2 computer systems. The Reference Diskette is sometimes referred to as a diagnostic, maintenance or service diskette. The purpose of the configuration program is to store values characterizing the configuration of this system 100 to NVRAM 248 which are saved when power is removed from the system. The NVRAM can be a low power CMOS memory with a battery backup.

Connected to the keyboard/mouse controller 244 are a port A 278 and a port B 280. These ports A,B are used to connect the keyboard 110 and the mouse 112 to the personal computer system 100. Coupled to the serial adapter 240 is a serial connector 276. An optional device such as a modem (not shown) can be coupled to the system through this connector 276. Coupled to the parallel adapter 238 is a parallel connector 274 to which a device such as the printer 114 can be connected. Connected to the diskette adapter 246 is a diskette connector 282 used to attach one or more diskette drives 108.

Figure 3C:
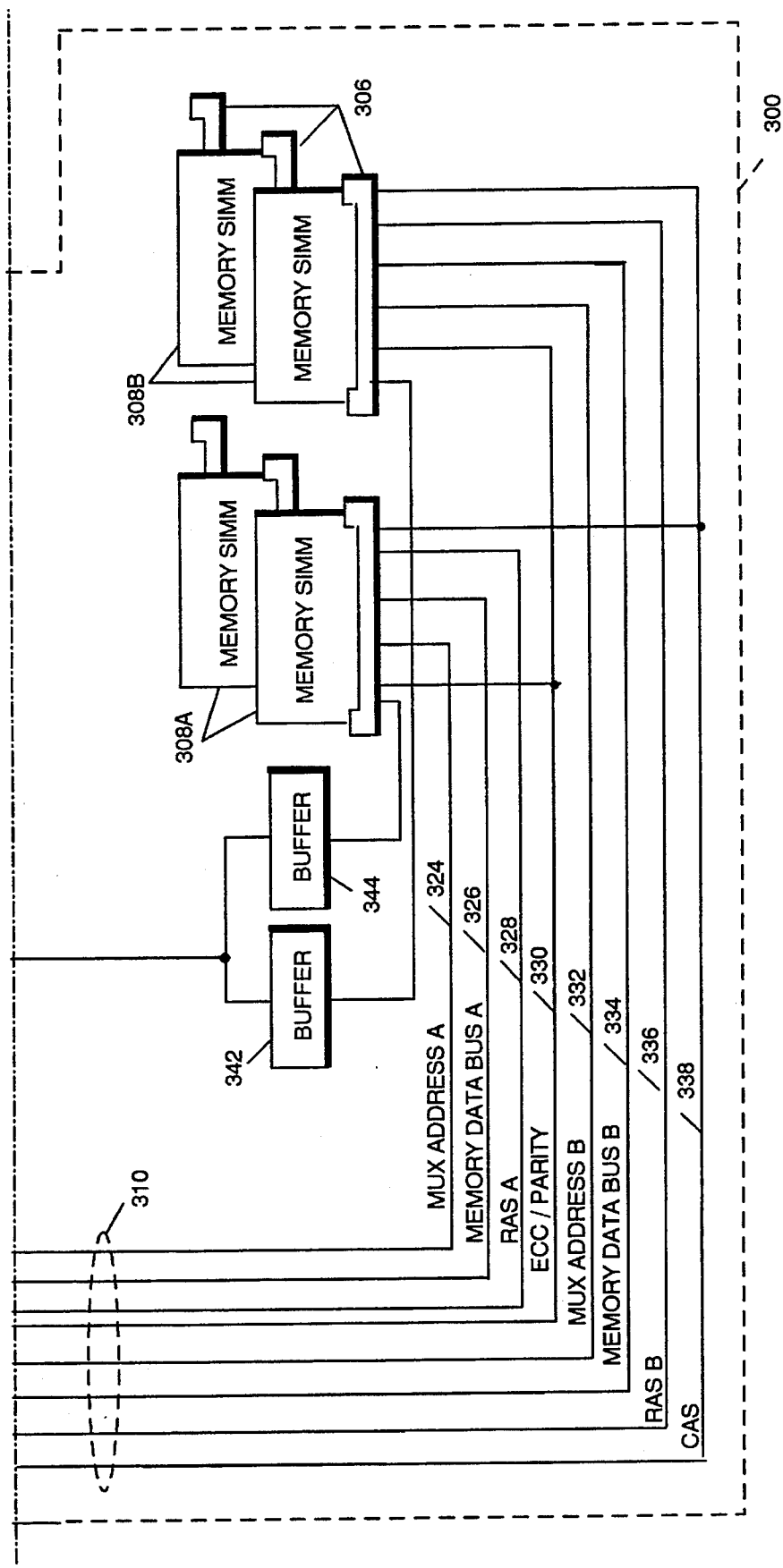
FIG. 3 is a block schematic diagram of an alternative planar board for the computer system of FIG. 1A.
Figure 4A:
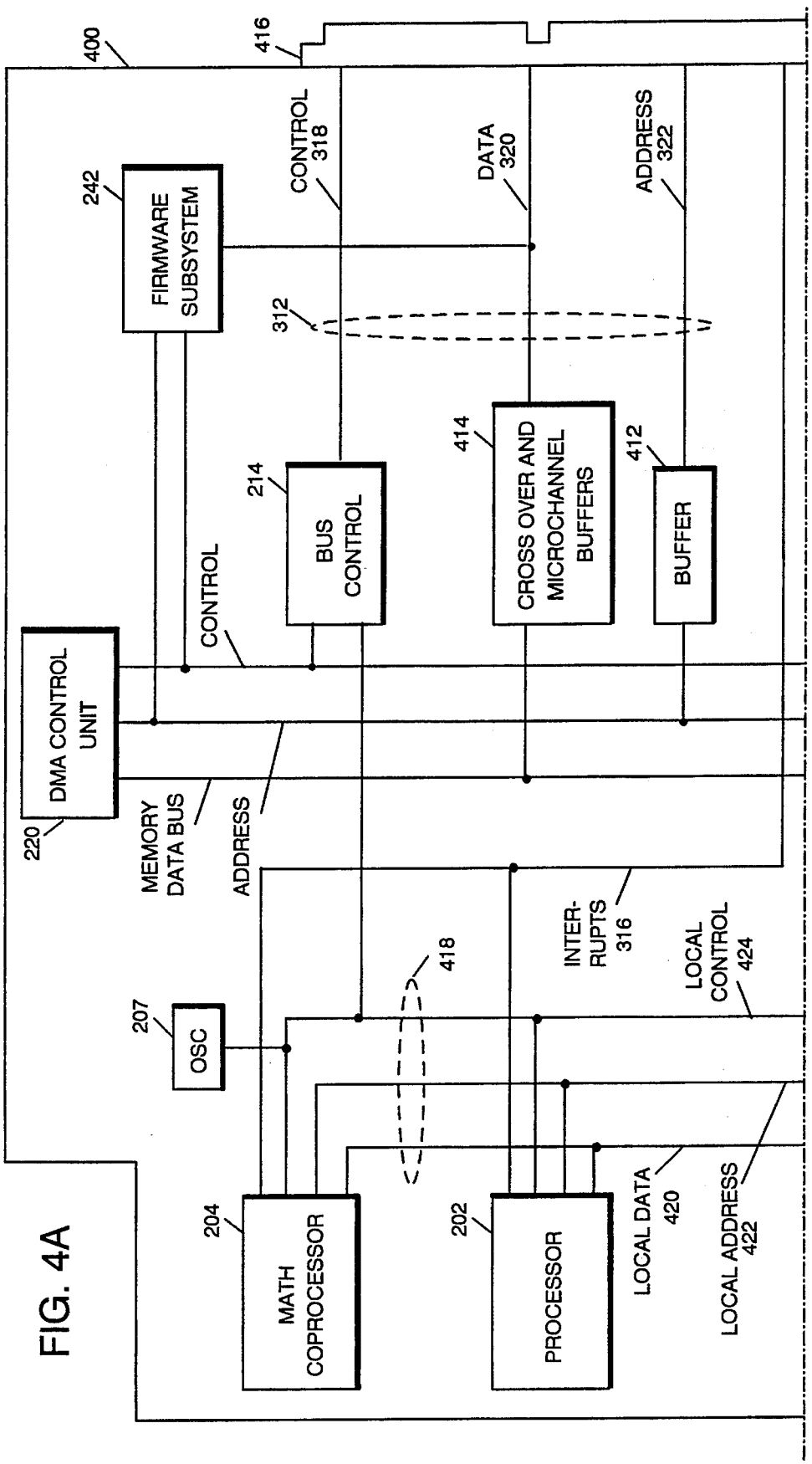
FIG. 4 is a block schematic diagram of a processor card for use with the alternative planar board of FIG. 3.

Referring to FIGS. 3 and 4, system unit 102 may also use a planar board 300 and a processor card 400 (FIGS. 3 and 4). The processor card 400 is removably mounted on and is electrically connected to the planar board 300. Identical element numbers of FIG. 2 correspond to identical elements in FIGS. 3 and 4.

Referring now to FIG. 3, the planar board 300 comprises a printed circuit board (PCB) 301 upon which are mounted (e.g., surface mounted) various components that are interconnected by wiring or circuits in the PCB. Such components include a suitable commercially available electrical connector 302 into which an edge 416 of the processor card 400 is plugged for removably mounting and electrically connecting the processor card 400 to the planar board 300. A plurality of single in-line memory module (SIMM) connectors 306 is also mounted on the PCB 301 for connecting to memory banks 308A, 308B forming the system main memory or RAM. One or more I/O bus or expansion connectors 232 are also mounted on the PCB 301 for connection to different expansion adapters and options that may be added or incorporated into the personal computer system 100. For example, the fixed disk drive 106 may be connected to an adapter card (not shown) having a disk controller which is connected to a connector 232. Preferably, each connector 232 is a commercially available connector of the type conforming to the above-mentioned MICRO CHANNEL architecture.

Also mounted on the planar board 300 are an interrupt controller 254 and a keyboard/mouse controller 244 which are connected to keyboard and mouse connectors 278, 280, a diskette controller or adapter 246 connected to a diskette connector 282, and serial and parallel adapters 240, 238 connected to serial and parallel connectors 276, 274 which allow the various I/O devices to be connected into the system. A system power connector 205 is mounted on the PCB 301 for connection to a power unit (not shown) that supplies the necessary power for the system. A nonvolatile memory (NVRAM) 248 and a time-of-day clock/CMOS RAM 250 are also mounted on the PCB 301. The PCB 301 also has mounted thereon various oscillators (not shown) to provide timing signals, and buffers 342, 344 (not all shown) to isolate sections of the circuitry in a manner well known.

The wiring of PCB 301 interconnects the various components as shown in the drawing and is grouped into three groupings, a memory bus 310 (including lines 324–338), a channel bus 312 (including an address bus 322, a data bus 320 and a control bus 318), and miscellaneous signal lines including interrupt lines 314, 316, all of which are connected to counterpart wiring on the PCB 401 through the connectors 302, 416. Tapped off the bus 312 is a planar function bus 319.

Referring to FIG. 4, there is shown the processor card 400 for removably mounting on the planar board 300. The processor card 400 comprises a printed circuit board (PCB) 401 having mounted (e.g., surface mounted) thereon a plurality of commercially available components including a processor 202, an optional math coprocessor 204, an optional cache controller 206, an optional cache memory 208, a direct memory access (DMA) control unit 220, a bus control unit 214, a memory control unit 256, a firmware subsystem 242, and parity checking units 402, 404. The processor 202 preferably is a high performance type, such as an Intel 80486, having thirty-two bit data paths and providing thirty-two bit addressing capability. Of course, Intel 80386 and the like processors can be used. The remaining components are selected in conventional fashion for their compatibility with such processor. A plurality of buffers 406, 408, 410, 412, 414 is connected as shown. The buffers provide selective isolation or connection between the circuits allowing different portions to be used concurrently, for example, to move data between the processor 202 and the cache memory 208 while other data is being transferred between an I/O unit and the main memory 308A, 308B. All of the above components are electrically connected to each other as appropriate by printed wiring circuits in PCB 401 which terminate at the edge connector 416. The edge connector 416 is pluggable into the edge connector 302 on the planar board 300 shown in FIG. 3 so that the planar board 300 and the processor card 400 are electrically and mechanically interconnectable.

The wiring circuits of the PCB 401 include a local bus 418 including data, address and control lines 420, 422, 424, respectively, which interconnect the processor 202 with an optional math coprocessor 204, an optional cache controller 206 and an optional cache memory 208, as shown in FIG. 4. The remaining circuit lines generally include interrupt lines 316, channel bus lines 312 and memory bus lines 310. The channel bus lines 312 include control, data and address bus lines 318, 320, 322, respectively. Memory bus lines 310 include multiplexed memory address lines 324, 332, row address strobe (RAS) lines 328, 336 for memory banks 308A, 308B, column address strobe (CAS) line 338, data bus A and B lines 326 and 334, and a line 330 for use in error checking via parity check or ECC checking. An oscillator 207 is connected as shown for providing suitable clock signals to the computer system 100. For simplicity, certain miscellaneous lines, such as reset, grounds, power-on, etc. have been omitted from FIGS. 2, 3 and 4.

During operation of a personal computer system 100 having a board 300 and a card 400, the card 400 is electrically and mechanically connected to the board 300 and typically lies in a plane perpendicular to the board 400.

ABIOS Load and Access

System firmware includes the Power-On Self Test program (POST) and the Basic Input Output System program (BIOS). BIOS further includes the compatibility BIOS or CBIOS and the advanced BIOS or ABIOS. POST is the set of instructions which execute when the system is first powered-on to initialize the personal computer system 100. BIOS is the set of instructions which facilitates the transfer of data and control instructions between the processor 202 and I/O devices.

In the medialess environment, a medialess system unit (e.g., 102B) includes a suitable network adapter or card (not shown) for providing a Remote Initial Program Load (RIPL) facility within the unit 102B. The card is connected, for example, to one of the connectors 232. The RIPL program permits booting an operating system from a network server 102 rather than from a local storage device such as the fixed disk 106 or the diskette 108. RIPL is also referred to as simply Remote Program Load or RPL, and the terms are used interchangeably. RPL is well understood in the art.

POST contains a bootstrap program which attempts to locate a boot device and load a boot record. Typically, the boot device is hardfile 106 or diskette drive 108. Diskette drive 108 requires a boot or operating system diskette to operate. If POST successfully loads a boot record from a boot device, then POST transfers control to the boot record, completing the operation of the POST bootstrap program. If a boot record was unable to be loaded and a RPL adapter is present, then POST transfers control to an RPL program. If no RPL program is present, then POST prompts the user indicating that a boot source is required. CBIOS is essential to the bootstrap operation of the computer. CBIOS provides a number of services including access to the hardfile 106 and diskette drive 108. ABIOS is demand initialized and normally not a required part of the POST bootstrap process.

Figure 5A:
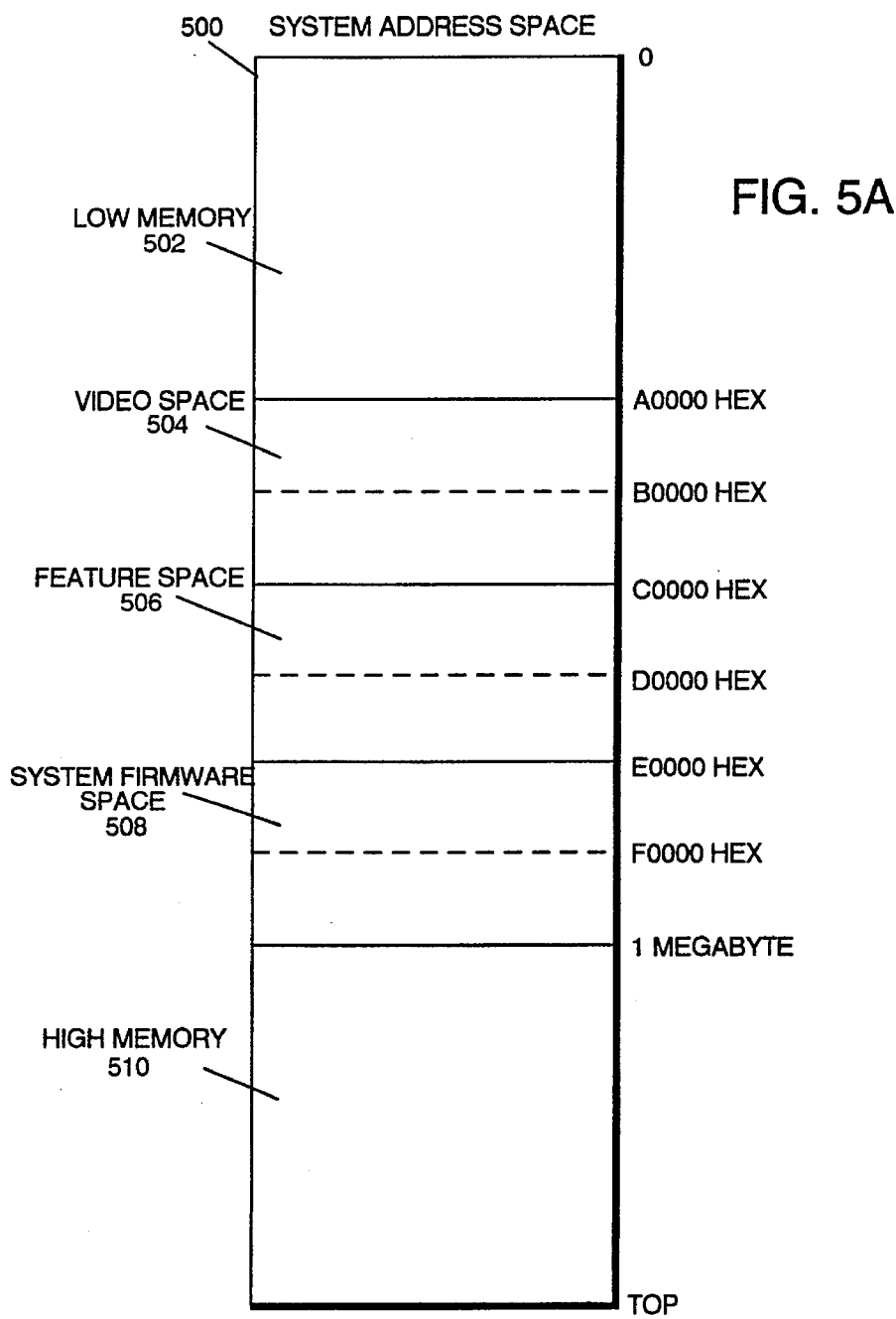
FIG. 5A is a diagram of the system address space for the computer system of FIG. 1A.

Referring now to FIG. 5A, there is shown a memory map of the system address space 500 for a client 102B or server 102 (FIG. 1B). The system address space 500 includes a plurality of memory address regions 502, 504, 506, 508, 510 which are addressable by the processor 202. The low memory region 502 is the traditional compatibility space in which real mode programs operate. For example, both DOS and CBIOS are real mode programs. The video region 504 occupies a 128K byte address space beginning at a physical location A0000 hex up through a physical location BFFFF hex or the A000 hex and B000 hex segments. (A segment is a real mode term used to describe a 64K byte region which is aligned on a 16 byte boundary, i.e., a paragraph boundary.) The video region 504 provides video regeneration buffers; data which are stored in these buffers define what a user sees on the computer display 104. The feature region 506 occupies a 128K byte address space beginning at a physical location C0000 hex up through a physical location DFFFF hex or the C000 hex and D000 hex segments. The feature region 506 is used to store adapter firmware; this region may also provide buffer space. For example, a small computer system interface (SCSI) disk controller adapter includes an adapter firmware ROM containing POST, CBIOS and ABIOS programs which during operation is stored in feature region 506. The system firmware region 508 occupies a 128K byte address space beginning at a physical location E0000 hex up through a physical location FFFFF hex or the E000 hex and F000 hex segments. The system firmware region 508 stores the system firmware including POST and BIOS. The region above a one megabyte boundary is a high or extended memory region 510. High memory 510 is utilized by operating systems such as the OS/2 operating system.

Extended memory refers to memory above the one megabyte address location. Expanded memory refers to memory which is bank switched into an area below the one megabyte address location. Expanded memory bank switching provides real mode applications with the ability to address more physical memory than the real mode address space directly allows. Expanded memory operation requires an available address space or window to be present in the real mode address space. Expanded memory operation also requires an expanded memory program to manage the bank switching. A common location for the expanded memory window is in the feature space 506 as well as the system firmware space 508. Maximizing the amount of available space for expanded memory windows is a competitive requirement for personal computer systems.

Figure 5B:
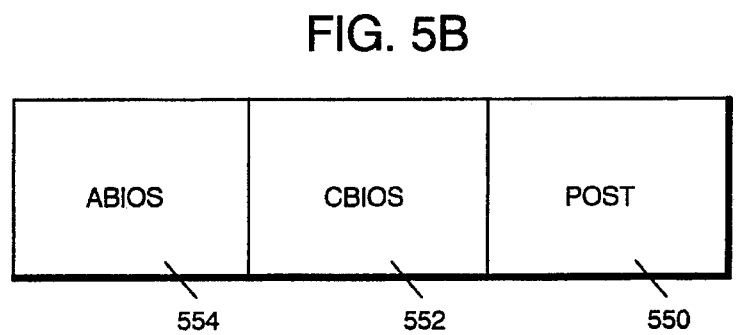
FIG. 5B is a diagram of a typical firmware memory map.

Referring to FIG. 5B, a firmware image includes an

ABIOS portion 554, a CBIOS portion 552, and a POST portion 550. For an adapter card firmware such as the IBM SCSI adapter card, the size of the ABIOS portion is approximately 11K bytes. For the system firmware such as the IBM PS/2 Model 95 XP 486, the size of the ABIOS portion is approximately 32K bytes. With both the adapter card firmware and the system firmware, ABIOS uses substantial portion of the overall address space. In the system firmware case, an ABIOS size of approximately 32K bytes occupies 25% of the system firmware space 508. For a computer system with eight feature slots, an equal distribution of feature firmware space results in 16K bytes of feature space 506 per slot or adapter. An ABIOS size of 11K bytes uses approximately 70% of the 16K byte range. Additionally, some adapters exceed the 16K byte range.

Figure 6:
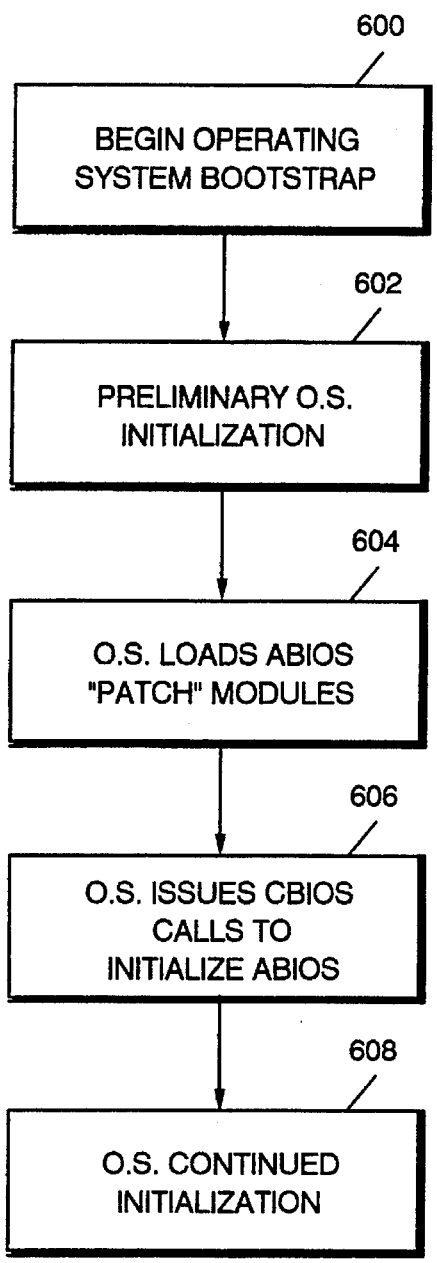
FIG. 6 is a flow diagram of a system initialization sequence as it pertains to ABIOS.

Referring now to FIG. 6, a flow diagram of an operating system bootstrap and initialization process is shown. After the computer system is powered on and the POST completes, the operating system begins to bootstrap, step 600. The operating system then begins some of its preliminary initialization, step 602. The type and scope of operating system preliminary initialization is well known. The operating system then loads the ABIOS patch modules or files, step 604. These patch files, normally resident on the operating system boot device, provide functional corrections and enhancements to existing resident ABIOS program code. The ABIOS program modules can be listed in a control file such as an ABIOS.SYS. This ABIOS.SYS list can be a text file containing the names of the ABIOS modules such as MODULE1.BIO, MODULE2.BIO, etc. The naming convention chosen is a matter of design choice. After the operating system has loaded the ABIOS patch module or modules, step 604, the operating system can then initialize ABIOS, step 606. ABIOS is initialized by issuing CBIOS function calls. Once ABIOS is initialized, step 606, the operating system can continue further initialization, step 608.

CBIOS provides two function calls to support the initialization of ABIOS. These calls are accessed through a CBIOS system services interface defined as software interrupt 15 hex (INT 15H). The first function call is a build system parameter table function which is indicated by the value of 04 being placed in the AH register (a shorthand notation for this function call is AH=04). The entry requirements of the AH=04 call are a pointer to a memory buffer where the caller wants the system parameters table to be built (this pointer is indicated by the notation ES:DI) and a segment with an assumed offset of zero which indicates the ABIOS extension area (this segment is indicated by the notation DS and the corresponding pointer would be DS:O). The second function call is a build initialization table function which is indicated by the value of 05 being placed in the AH register (AH-05). The entry requirements for the AH=05 call are a pointer to a memory buffer where the caller wants the initialization table to be built (ES:DI) and a segment with an assumed offset of zero which indicates the ABIOS extension area (DS). ABIOS initialization is more clearly defined in the IBM Personal System/2 and Personal Computer BIOS Interface Technical Reference Manual.

Figure 7:
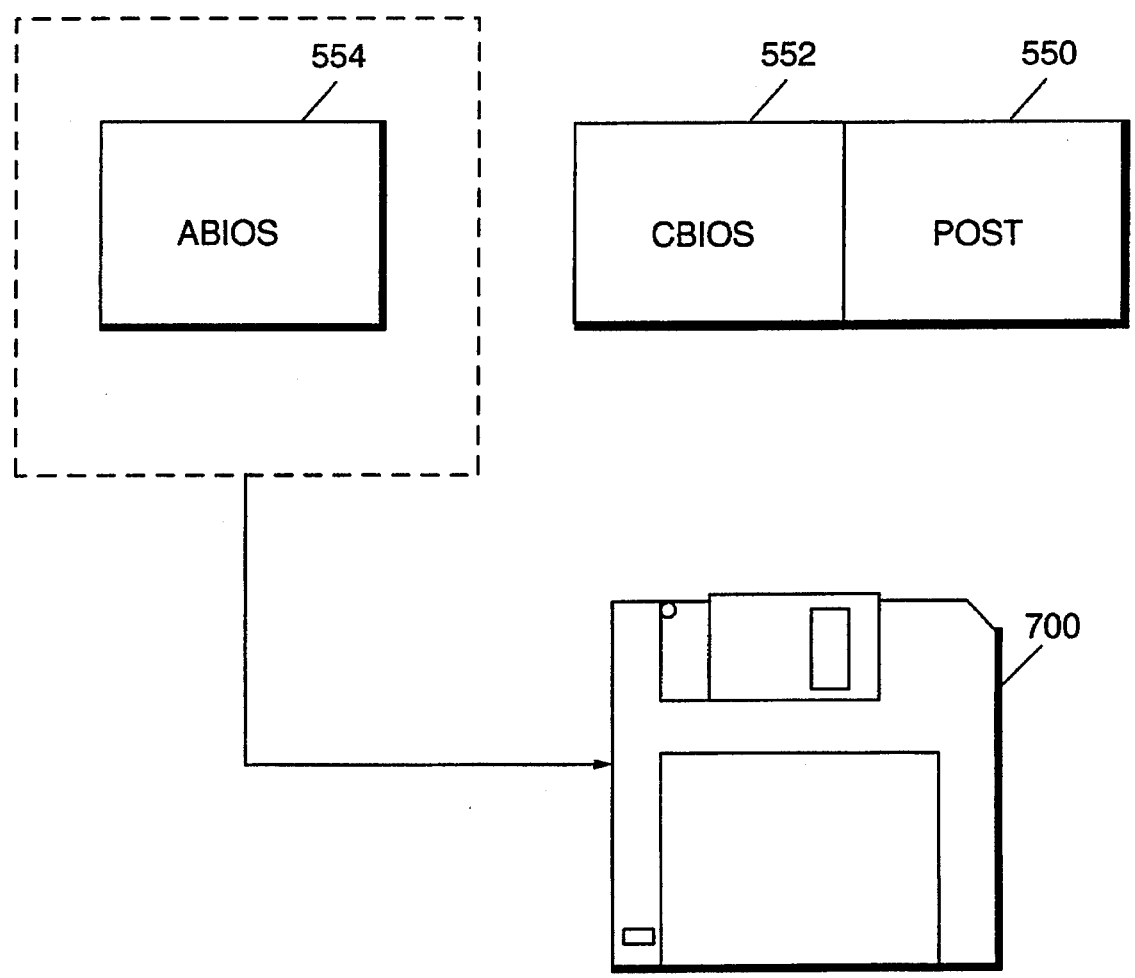
FIG. 7 is a diagram of an enhanced delivery mechanism for ABIOS.

Referring to FIG. 7, in an enhanced delivery mechanism for ABIOS, the ABIOS 554 is physically separated from the remaining firmware, and packaged as a file on diskette 700 or other media. By being physically separated from the remaining firmware, the space occupied by ABIOS in firmware address space 506, 508 is freed. Moving ABIOS 554 applies to both the system firmware ABIOS as well as feature space ABIOS. Accordingly, the space normally occupied by ABIOS in system firmware space 506 is freed and the space normally occupied by ABIOS in feature space 508 is freed.

Referring now to FIG. 9, an ABIOS module header is shown. The field at offset +14H (an offset of 14 hex bytes or 20 decimal bytes), which prior to the present invention was a reserved field, stores an offset of the ABIOS initialization programs. These ABIOS initialization programs are accessed through the CBIOS system services functions AH=04 and AH=05. Of course, other means to extend a header and provide an entry point field are possible and matters of well known design choice. Other table entries are set forth in the ABIOS section of the IBM Personal System/2 and Personal Computer BIOS Interface Technical Reference Manual.

Referring to FIG. 10A, a diagram of NVRAM 248 which includes a location for storing a load indicator (called ABIOS-REQUIRED-FLAG) 1000 of the present invention is shown. NVRAM 248 is accessed via standard I/O commands in a conventional manner. The ABIOS-REQUIRED-FLAG indicates whether ABIOS should be loaded into RAM by POST. The loading of ABIOS is described in greater detail in conjunction with FIG. 10B. A default value for the ABIOS-REQUIRED-FLAG is established during the configuration stage of computer system setup. A program, such as a Setup program which is included with the system Reference Diskette, establishes the initial value for the ABIOS-REQUIRED-FLAG. A thorough description of the Setup program is set forth in the Setup section of the IBM Personal System/2 Hardware Interface Technical Reference-Architectures, October 1990. The ABIOS-REQUIRED-FLAG may have a low, i.e., no load, value which indicates that ABIOS should not be loaded or a high, i.e., load, value which indicates that ABIOS should be loaded.

Referring now to FIG. 10B, a flow diagram of the operation of POST as it relates to the loading of ABIOS is shown. When the computer system is first powered-on, POST begins to execute. Early POST operation step 1002 includes tests and initialization of the various hardware components of the system and is a matter of well known design choice. POST then reads the ABIOS-REQUIRED-FLAG from NVRAM at read flag step 1004. The ABIOS-REQUIRED-FLAG value is checked to determine whether it is high indicating an ABIOS load is required at check flag step 1006. If the check of step 1006 is not high, control passes to continue POST step 1014. If the check of step 1006 is high, then POST establishes an ABIOS load area at load area step 1008. Preferably, the ABIOS load area is established at the top, i.e., at the highest addresses, of the low memory region 502; the apparent amount of low memory available is thus reduced by the amount of memory that the ABIOS occupies. The apparent amount of low memory available is discussed in conjunction with FIG. 10C.

Referring to FIG. 10C, a diagram of the low memory address region 502 is shown. The low memory address region 502 includes a low memory size value 1016 which indicates the number of available bytes in the low memory address region 502. The extended BIOS data area (EBDA) 1018 is a data area available for use by programs such as CBIOS. The ABIOS load area 1020 is the area where ABIOS can be optionally loaded.

Referring again to FIG. 10B, once the ABIOS load area is established in load area step 1008, POST loads ABIOS into RAM at load step 1010. POST obtains the ABIOS program from a storage media such as disk 106. For example, a fixed location on the disk 106, such as the last one megabyte of storage space, may be reserved for storing the ABIOS program. The ABIOS program is stored to disk 106 by a program such as the Setup program. Storing data, such as the ABIOS program, on a disk 106 is well known. POST then stores an ABIOS-LOCATION pointer, preferably in a predetermined location in the EBDA 1018 at store location step 1012; the ABIOS-LOCATION pointer indicates the address of the ABIOS load area. The ABIOS-LOCATION pointer is preferably in segment:offset form with an offset value of zero. POST then continues execution at continue POST step 1014; POST may include further test and initialization.

There are two primary alternatives for ABIOS load for systems which have no local disk and are LAN connected clients, disk emulation and stub download. Disk emulation masks the physical location of disk 106 from programs such as POST. In disk emulation, the traditional disk interface, such as the CBIOS disk interface, is maintained for both local and remote disks. For example, the RPL program, previously described, can be implemented to intercept the CBIOS disk requests and pass the requests on to a server. The server services the disk request. The results of the disk request are returned to the client through the disk emulation portion of the RPL program. Thus a program, such as POST, may access a remote disk in a compatible fashion to accessing a local disk. Typically, the disk emulation portion of the RPL program would be stored in a ROM as part of the network adapter. In a stub download system, POST bypasses the ABIOS load procedure of steps 1004–1012 of FIG. 10B, and defers ABIOS load to a network boot program. The network boot program is a program loaded in the client from the server by the RPL program. The primary function of the network boot program is to load an operating system into the client. A secondary function of the network boot program, in a stub download system, is to perform steps 1004–1012 of FIG. 10B.

Figure 8:
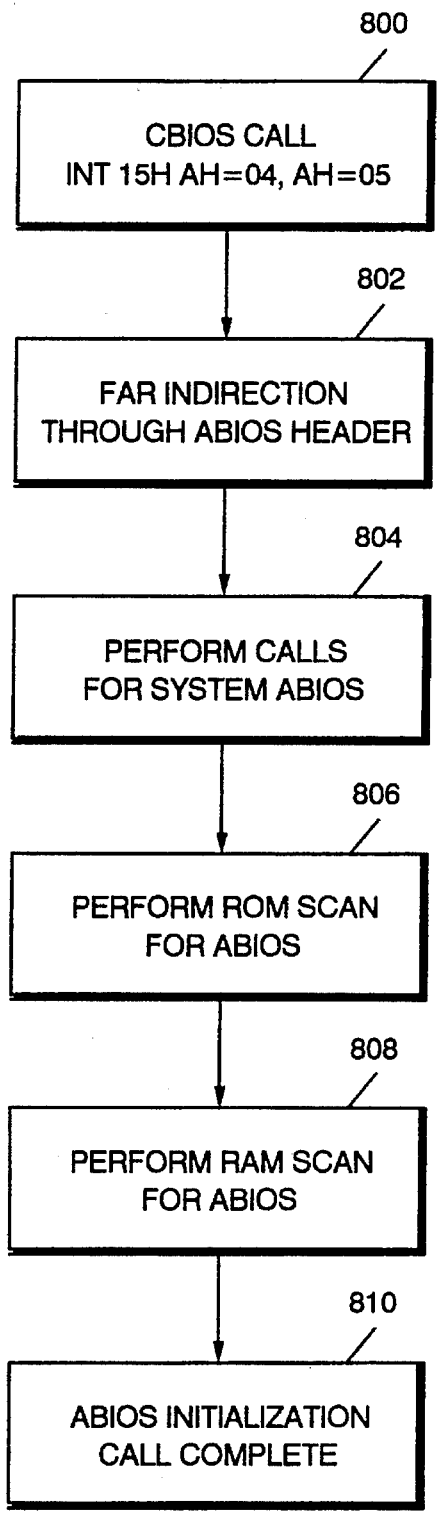
FIG. 8 is a flow diagram of the internals of ABIOS initialization.

Referring to FIG. 8, a flow diagram of ABIOS initialization is shown. The INT 15H ABIOS initialization calls AH=04 and AH=05 are done sequentially, AH=04 then AH=05. An operating system, or other software program, accesses ABIOS initialization through the CBIOS system services calls AH=04 and AH=05 at initialization step 800. The CBIOS system services call redirects control, at redirect step 802, to the ABIOS initialization program now present in RAM. When CBIOS system services begins ABIOS initialization at initialization step 800, the CBIOS system services code resident in the system firmware locates and transfers control to the now RAM resident ABIOS initialization program. This is done using the previously described ABIOS-LOCATION pointer, which indicates the address of the ABIOS load area 1020. The ABIOS-LOCATION pointer is obtained from the EBDA 1018. The value of the offset of the ABIOS initialization routine is found at an offset of +14H in the ABIOS header (see FIG. 9); this value is accessed using the ABIOS-LOCATION pointer. The ABIOS initialization offset is used in conjunction with the segment specified by the ABIOS-LOCATION pointer to access the ABIOS initialization program; control is transferred to this address. The ABIOS initialization program then performs a set of procedure calls to initialize ABIOS at perform calls step 804. The ABIOS initialization program then performs a ROM scan operation which locates and initializes ABIOS which is present in the adapter firmware address space at ROM scan step 806. The ROM scan operation is performed by searching for a specific header pattern in the feature space or adapter firmware space (see FIG. 5A). The ABIOS initialization program then performs a RAM scan operation which locates and initializes ABIOS which is present as a RAM loaded extension or patch at RAM scan step 808. Once the RAM scan operation is complete, the ABIOS initialization is complete, and control returns to the caller at initialization complete step 810.

Providing an ABIOS which is loadable and separate provides a computer system with a plurality of advantages. A loadable ABIOS increases the amount of available address space in both the system firmware space 508 and the feature space 506. Increasing the amount of available space in the system firmware space 508 and the feature space 506 allows and enhances the operation of expanded memory manger programs. Also, increasing the amount of available space in the system firmware space 508 and feature space 506 allows for larger POST and CBIOS programs to be resident in the respective spaces. Automated loading of separate ABIOS provides compatibility because ABIOS appears to be resident when required. Additionally, development, test, distribution and maintenance of ABIOS becomes simplified since ABIOS is a single entity rather than part of a POST CBIOS ABIOS bundle.

While a preferred embodiment of the present invention was described above, it will be understood by those skilled in the art that various changes in detail may be made without departing from the spirit, scope, and teaching of the invention. For example, while the preferred embodiment uses Intel processors and an IBM PS/2 MICRO CHANNEL bus for illustrative purposes, this invention can be implemented on other processors and/or bus types. Likewise, those skilled in the art will recognize that many elements of the invention can be implemented either in hardware or software. Accordingly, the invention should be limited only as specified by the appended claims.

What is claimed is:

1. A personal computer system compatible with application programs and operating system software, the personal computer system comprising:

a data bus;

a microprocessor electrically coupled to said data bus; said microprocessor having different first and second modes of operation; said first and second modes having respective different first and second memory addressing ranges, said second range being greater than said first range; said microprocessor operating in said first mode during initialization of said system and continuing after said initialization to operate either in said first mode or in said second mode; said microprocessor being capable of handling application programs while operating in either said first mode or said second mode; said microprocessor using different first and second portions of operating system microcode when operating respectively in said first and second modes;

non-volatile memory electrically coupled to the data bus, and accessible to said microprocessor via said data bus;

said non-volatile memory storing said first portion of operating system microcode for use by said microprocessor in said first mode, said first portion of operating system microcode including an initialization program, said non-volatile memory also storing a load indicator, inspected by said microprocessor during initialization of said system, for indicating if said personal computer system does or does not require access to said second portion of operating system microcode for subsequent operations;

volatile memory electrically coupled to the data bus, and accessible to said microprocessor via said bus; and, a direct access storage device electrically coupled to the data bus, and accessible to said microprocessor via said bus, said direct access storage device storing said second portion of operating system microcode, said microprocessor being responsive to said load indicator for loading said second portion of operating system microcode into said volatile memory during execution of said initialization program when said load indicator indicates that said personal computer requires access to said second portion of operating system.

2. The computer system of claim 1 wherein said first portion of operating system microcode includes compatibility operating system microcode used by said microprocess for compatibly handling application programs written only for said first mode of operation of said microprocessor; and said second portion of operating system microcode includes advanced operating system microcode for enabling said microprocessor to handle application programs written for either said first or second mode of operation of said microprocessor.

3. The computer system of claim 1 wherein said non-volatile memory includes separate first and second non-volatile memory storage spaces;

said first non-volatile memory storage space storing said first portion of said operating system microcode, and said second non-volatile memory storage space storing said load indicator.

4. The computer system of claim 1 wherein said direct access storage device is remote from said microprocessor and is accessed by said microprocessor via a network.

5. An apparatus for loading an operational interface used in the operation of a personal computer system containing a system processor, a non-volatile memory, a volatile memory, and a direct access storage device; said volatile and non-volatile memories and said direct access storage device being accessible to said system processor; said non-volatile memory storing a first portion of an operational interface used by said system processor for initializing said computer system and potentially for handling application programs after initialization of said system; said direct access storage device storing a second portion of an operational interface which also may be used by said system processor after initialization of said system; said first and second portions having respective different first and second memory addressing range capabilities; said second addressing range containing and being larger than said first addressing range; said apparatus comprising:

load indicator means for indicating whether the computer system requires the second portion of the operational interface;

means for initializing the system with the first portion of the operational interface and for conditionally relocating said first portion of the operational interface in said volatile memory upon completion of said initialization, thereby freeing up a portion of the memory addressing space available to said computer system in said first addressing range which space had been allocated to said first portion prior to said relocation;

said means for initializing loading the second portion of the operational interface from said direct access storage device into said volatile memory when said load indicator means indicates that such loading of said second portion is required.

6. The computer system of claim 5 wherein the first portion of the operational interface includes compatibility operating system microcode required by said system processor for initializing said system and for providing compatible handling of application programs written to address only said first address range, and the second portion of the operational interface includes advanced operating system microcode enabling said system processor to handle program applications involving addressing of memory in either one of said first and second memory addressing ranges.

7. The computer system of claim 5 wherein said non-volatile memory includes first and second non-volatile memory storage spaces, said first non-volatile memory storage space storing said first portion of said operating system microcode, and said second non-volatile memory storage space storing load indicator information controlling the action of said load indicator means.

8. The computer system of claim 7 wherein the first portion of the operational interface includes a power on self test program including a portion which in conjunction with said system processor forms said load indicator means.

* * * * *